United States Patent [19]

Erickson

[11] 4,371,980
[45] Feb. 1, 1983

[54] SELF ALIGNING BAND-PASS FILTERING SYSTEM

[75] Inventor: Bert K. Erickson, Fayetteville, N.Y.

[73] Assignee: General Electric Company, New York, N.Y.

[21] Appl. No.: 159,879

[22] Filed: Jun. 16, 1980

[51] Int. Cl.³ .............................................. H04B 1/18
[52] U.S. Cl. .................................. 455/208; 455/122; 455/125; 331/16; 332/30 V
[58] Field of Search ............... 455/75, 120, 122, 123, 455/124, 125, 205, 206, 207, 208, 210, 211; 331/1 R, 16, 116 R, 117 R; 332/1, 30 V; 334/13, 15

[56] References Cited

U.S. PATENT DOCUMENTS

| | | | |
|---|---|---|---|
| 2,474,354 | 6/1949 | Guanella | 455/75 |
| 3,165,697 | 1/1965 | Reich | 455/124 |
| 3,255,414 | 6/1966 | Kawalek | 455/122 |
| 3,329,900 | 7/1967 | Graves | 455/208 |
| 4,089,495 | 5/1978 | Knight | 455/208 |
| 4,158,182 | 6/1979 | Washburn | 455/124 |

Primary Examiner—Tommy P. Chin
Attorney, Agent, or Firm—Carlos Nieves; George R. Powers; John R. Rafter

[57] ABSTRACT

An FM receiver includes a varactor tuned RF filter to which is applied a bias voltage and a 20 Hz sinusoidal signal for varying the varactor capacitance and the resonant frequency of the filter. As a result, an FM broadcast signal in the pass-band of the filter is phase-modulated by the filter. The second harmonic of the phase modulation is recovered and coupled to a synchronous detector driven at a 40 Hz rate to provide an error voltage. The bias voltage is related to the integral of the error voltage. A difference between the frequency about which the tuned circuit periodically varies and the carrier frequency of the FM signal cause the bias voltage to vary so as to reduce the magnitude of the difference, thereby fine-tuning the receiver.

14 Claims, 2 Drawing Figures

SELF ALIGNING BAND-PASS FILTERING SYSTEM

BACKGROUND OF THE INVENTION

1. Field of the Invention

The subject invention relates to apparatus for automatically fine-tuning a band-pass filter to the carrier frequency of a modulated signal applied to the filter.

2. Description of Prior Art

Persons skilled in the art to which the invention relates are at least constructively aware of systems, such as disclosed in U.S. Pat. Nos. 3,165,697 and 3,255,414, in which automatic fine tuning of a band-pass filter is achieved using an output signal of the filter to provide a signal which controls a tuning component of the filter. More specifically, U.S. Pat. No. 3,165,697 discloses a tuned cavity amplifier, the cavity of the amplifier being tunable with a plunger. In operation, the plunger is sinusoidally varied and a signal applied to the cavity amplifier results in the generation of an amplitude modulated signal. The amplitude modulation is detected and used in a feedback scheme to determine the position about which the plunger is sinusoidally varied. In the steady state, the position about which the plunger is varied substantially corresponds to the carrier frequency of the applied signal. U.S. Pat. No. 3,255,414 discloses a transmitter having an output tuned circuit including a controllable inductor. In operation, a first control winding of the inductor receives a low frequency signal (100 Hz) which periodically varies the resonant frequency of the circuit. With the circuit being varied, a signal applied to the tuned circuit results in the generation of an amplitude modulated signal. The phase of the modulation is dependent upon whether the frequency about which the turned circuit is dithered is higher or lower than the carrier frequency of the signal. A phase discriminator responds to the low frequency signal and the amplitude modulation to provide to a second control winding of the inductor a signal which tunes the circuit. In the steady state, the frequency about which the turned circuit is dithered corresponds to the frequency of the signal being transmitted.

SUMMARY OF THE INVENTION

Briefly, the invention herein is a tunable band-pass filtering system which is responsive to the carrier frequency of a frequency modulated signal in the bandpass for substantial alignment therewith. The system comprises a tunable band-pass filter having a phase characteristic which is substantially linear to signal frequencies in the mid-band range of the filter and nonlinear to signal frequencies at either edge-band range of the filter; means for periodically varying the midfrequency of the band-pass filter at a predetermined frequency rate, whereby when the modulated signal is applied to the filter a similar frequency modulated signal is provided, the similar signal including phase modulation at said predetermined frequency rate; and means responsive to the phase modulation, at the predetermined frequency rate on the similar signal for automatically tuning the midfrequency of the filter to reduce its difference with respect to the carrier frequency of the frequency modulated signal.

An object of the invention is to provide a filtering system which substantially aligns itself with the carrier frequency of a selectable FM broadcast signal.

A feature of the invention is that the filtering system may be used as part of an FM broadcast radio receiver, whereby the self alignment characteristic of the system eliminates a need for the customary and costly three-point tracking adjustment.

BRIEF DESCRIPTION OF THE DRAWINGS

The above-mentioned and other objects and features of the invention will become apparent by reference to the following description in conjunction with the accompanying drawings, in which.

DESCRIPTION OF A PREFERRED EMBODIMENT

Figure 1:
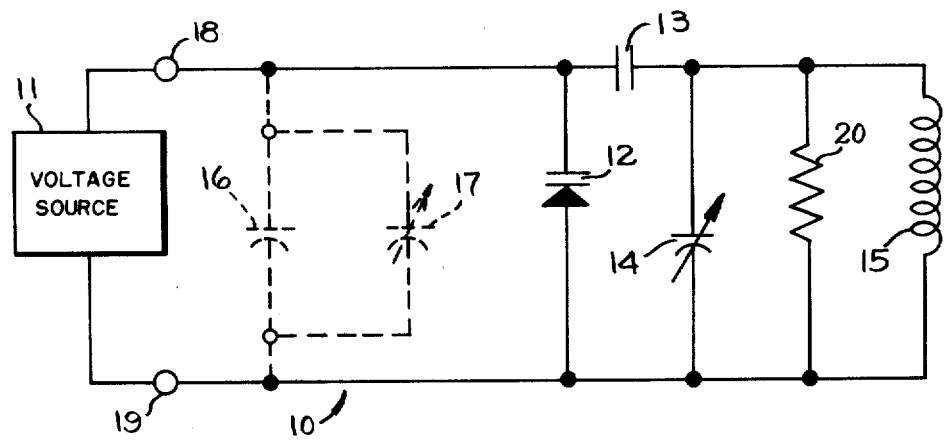
FIG. 1 is a schematic of a varactor tuned circuit.

The invention, as incorporated in a preferred embodiment, takes advantage of characteristics of a varactor tuned parallel circuit, such as shown in FIG. 1 with solid lines. Some of these characteristics are latent and, therefore, will be developed for the reader.

Referring to FIG. 1, in the varactor tuned circuit 10 a high impedance voltage source 11 is coupled in parallel with a varactor diode 12 and a series circuit. The series circuit includes a capacitor 13 having a value of $C_{dc}$ farads and a parallel resonant circuit, the resonant circuit comprising a tuning capacitor 14 having a set value of $C_t$ and an inductor 15 having a value of $L_o$ henries. Source 11 provides a DC voltage $V_r$ for biasing varactor diode 12 to provide a capacitance $C_r$ and a low frequency sinusoidal signal of small value, superimposed on the DC voltage, for varying the varactor capacitance $C_r$ by an amount $C_d$. Since the superimposed voltage varies with time $C_d$ also varies with time. In this example, the value $C_{dc}$ of capacitor 13 is selected to block DC and low frequency voltages while passing, with insignificant attenuation, frequencies within the 3 db bandwidth of the circuit.

For analytical purposes, varactor diode 12 may be replaced by equivalent capacitors 16 and 17 (shown in dotted lines) having values of $C_r$ and $C_d$, respectively. In the analysis which follows $C_r$ will be presumed to remain constant and $C_d$ will be permitted to vary. Therefore, capacitor 17 is represented as a variable capacitor. Also, capacitor 14 will be considered to remain, throughout the analysis, at the value $C_t$. Defining $C_o$ as equal to the sum of $C_t + C_r$, the radian resonant frequency $\omega$ of the circuit is given by:

$$\omega = \frac{1}{\sqrt{L_o(C_o + C_d)}} = \frac{1}{\sqrt{L_o C_o (1 + C_d/C_o)}}$$

Defining $\omega_o$ as the radian resonant frequency when $C_d$ is equal to zero, $$\omega_o = 1/\sqrt{L_o C_o} \text{ and } \omega = \frac{\omega_o}{\sqrt{1 + C_d/C_o}}.$$

Using the binomial expansion theorem, for $C_o >> C_d$ $$\omega \doteq \omega_o (1 - C_d/2C_o)$$

and, therefore, frequency deviations df in the resonant frequency of the circuit are related to deviations $dC_d$ by the equation:

$$df = -\frac{f_o dC_d}{2C_o}$$

where $f_o$ is the resonant frequency when $C_d$ is zero. Significantly, df and $dC_d$ are linearly related.

In the varactor diode the change in capacitance $dC_d$ as a function of a change in applied voltage $dV_r$, herein equal to the low frequency signal, is given by $$dC_d = -\frac{K\, dV_r}{V_r^{(\alpha+1)}}$$

where K and $\alpha$ are constants. Therefore, $$df = \frac{Kf_o\, dV_r}{2C_o V_r^{(\alpha+1)}}$$

This last equation makes it clear, subject to the requirement that $C_o>>C_d$, frequency deviation of the resonant frequency of the filter is linearly related to voltage deviations provided by the source. Under the circumstances, it will be appreciated that the low frequency signal sinusoidally varies the resonant frequency of the described circuit.

As is known, at the terminals of a tunable parallel resonant circuit the voltage and current have a phase relationship which is a function of the frequency difference between the frequency $f_1$ of the applied signal and the resonant frequency $f_i$ of the tunable circuit. In fact, the voltage to current phase is given by:

$$\theta = -\arctan\frac{f_1^2 - f_i^2}{f_1 B} \doteq -\arctan\frac{2(f_1 - f_i)}{B}$$

where B is the 3 db bandwidth of the circuit. For $f_1 - f_i$ equal to B/3, the magnitude of $\theta$ is about 33 degrees; and for values of $f_1 - f_i$ less than B/3, $\theta$ is substantially a linear function. Referring again to FIG. 1, if it is assumed that the source 11 also supplies a sinusoidal current $i_1$, where $i_1 = I_2 \sin 2\pi f_1 t$, the magnitude of the voltage caused across terminals 18 and 19 by $i_1$ is not large enough to substantially affect the capacitance provided by the varactor 12, and that $f_i = f_o + df$, then $$\theta = -\arctan\frac{2[f_1 - (f_o + df)]}{B}$$

Since $f_1$, $f_o$ and B are substantially fixed, when df varies sinusoidally if the maximum value of $\theta$ is less than 33 degrees, $\theta$ will also vary sinusoidally. In the case where $f_1 = f_o$ and the sinusoidal variation of df varies the maximum value of $\theta$ to 33 degrees, the voltage across terminals 18 and 19 experiences a peak frequency deviation $\Delta f$ of $\theta_r f_m$, where $\theta_r$ is the maximum phase shift in radians and $f_m$ is the frequency of the sinusoidal variation. For $f_m$ equal to 20 Hz and $\theta$ equal to 33 degrees, $\Delta f$ equals 11.5 Hz.

From the foregoing, it should be appreciated that the circuit is capable of providing, from a current supplied at frequency $f_1$, a phase modulated voltage, the modulation being related to the difference between $f_1$ and the instantaneous center frequency of the filter, and the bandwidth of the filter. With df varied sinusoidally and with $f_1$, $f_o$, and B having values which keep $\theta$ at less than 33 degrees, a phase detector can be used to recover a substantially sinusoidal signal at the modulating frequency. Under these circumstances, if $|f_1 - f_o|$ is allowed to increase, amplitude variation of the detected signal (either negative or positive) becomes limited, the sense being related to whether $f_1$ is greater than or less than $f_o$. It may be noted that if $f_1 - f_o$ is zero and the maximum phase shift is about 33 degrees, an increase or a decrease in the value of $f_1$ substantially limits one side of the detected signal, whereas if the maximum phase shift is less than 33 degrees, $f_1$ can vary somewhat before the detected signal shows any amplitude limitation. As will appear, the sense and extent of amplitude limitation may be used in a closed loop system to minimize $f_1 - f_o$ by changing, for example, the capacitance $C_o$ of the circuit and, therefore, $f_o$.

Figure 2:
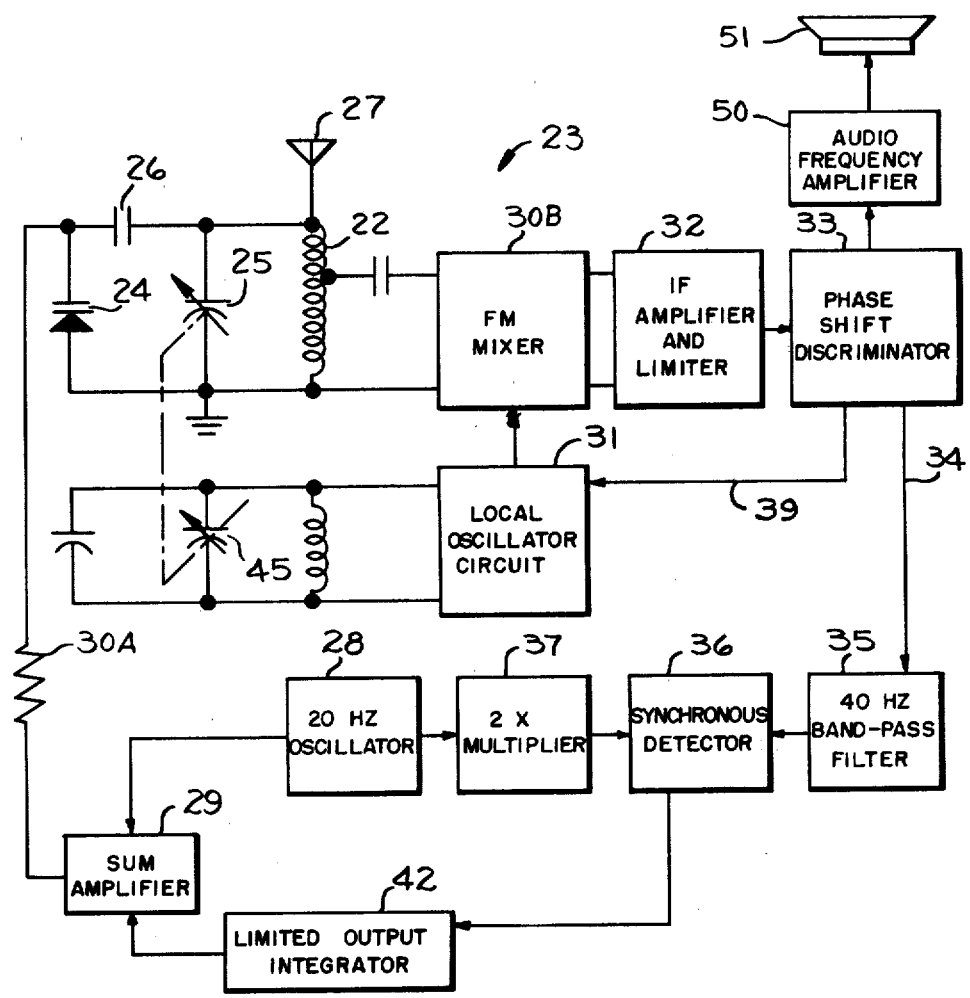
FIG. 2 is a block diagram of a band-pass filtering system, according to the invention, incorporated in an FM broadcast receiver.

A varactor tuned circuit, similar to the filter 10 of FIG. 1, is shown in FIG. 2 as part of a band-pass filtering system 23 incorporated in an FM receiver. As will appear, system 23 is responsive to the carrier frequency of a frequency modulated signal in the pass-band of the tuned circuit for substantial alignment therewith.

Referring to FIG. 2, the tuned circuit, which may also be referred to as a tunable band-pass filter, includes a capacitor network having a varactor 24, a tunable capacitor 25 and a DC blocking capacitor 26. Varactor 24 and capacitors 25 and 26 function in the same manner as varactor 12 and capacitors 14 and 13, respectively, in FIG. 1. The tuned circuit also includes an inductor 22 which is coupled in parallel to capacitor 25 and serves the same function as inductor 15. Capacitor 25 has a tuning range which is capable of tuning the circuit over the FM broadcast band, which currently extends from 88 to 108 megahertz. In this embodiment, inductor 22 is coupled to an antenna 27 which is suitable for receiving FM broadcast signals and includes a tap for coupling the tuned circuit to a load, which may be the input impedance of a mixer or a preceding amplifier. The load, resistance of the inductor, the antenna, and the resistance of a circuit, described below, for applying a bias voltage to the varactor need to be considered in determining the bandwidth of the circuit. However, regardless of the actual bandwidth, it should be recognized that the circuit has a phase shift characteristic which is substantially linear to signal frequencies in the mid-band range of the filter and non-linear to signal frequencies at either edge band range of the filter. Since the phase shift of the filter is given by an arc tangent function, a precise definition of mid-band range is difficult in that it depends on how much deviation is permitted in the phase shift with regard to a truly linear phase versus frequency relationship. However, it seems fair to say that such a range should include frequencies which do not deviate from the resonant or midfrequency of the filter (with the varactor DC biased) by an amount equal to one-third of the 3db bandwidth.

The system also includes means for periodically varying the midfrequency of the band-pass filter at a predetermined frequency rate. In the subject embodiment these means include the 20 Hz sinusoidal oscillator 28, which is coupled to varactor diode 24 by a summing amplifier 29, and resistor 30A.

From the foregoing, it should be appreciated that when the midfrequency of the band-pass filter is being varied, a frequency modulated signal (in the pass-band) supplied by the antenna to the filter causes the generation of a similar signal which, in addition, is phase modulated at the oscillator rate.

Means responsive to the phase modulation on the similar signal are used in the system to automatically tune the midfrequency of the filter in a manner which reduces its difference with respect to the carrier frequency of the frequency modulated signal. More specifically, the means responsive to the phase modulation include a phase demodulator. In this embodiment the demodulator includes an FM mixer 30B AC coupled to inductor 22, a tunable local oscillator 31 coupled to the mixer to translate the generated phase modulated signal to an IF amplifier and limiter 32, and a phase shift discriminator 33 which provides on output line 34 a signal which is proportionally related to the phase modulation. Collaterally, discriminator 33 provides an automatic frequency control signal, via line 39, to oscillator 31. In this regard, the time constant of the circuit (not shown) providing automatic frequency control is large enough to suppress audio signals originated by oscillator 28. Consequently, AFC operation has no direct effect on $f_1$ or $f_i$.

The phase modulation can be sinusoidal, can be sinusoidal but for limited positive or negative amplitudes, or can be sinusoidal but for limited positive and negative amplitudes. In the case where the modulation is sinusoidal but for limited positive or negative amplitudes, it may be recognized that the signal, from a mathematical standpoint, is an even function having a second harmonic component, the magnitude and sense of this harmonic being related to the sense and magnitude of the limitation. To derive a signal related to the magnitude and sense of the limitation, the signal on output line 34 is applied to a 40 Hz band-pass filter and the output signal of the filter 35 is applied to a synchronous detector 36. The 20 Hz oscillator 28 supplies a signal to two times multiplier 37 and the multiplier also supplies a 40 Hz signal to the detector 36. In consequence, the detector provides a DC signal whose magnitude and sense are related to the limitation. The signal is coupled to a limited output integrator 42 and a signal proportionally related to the output signal voltage of the integrator is used to bias the varactor 24. The proportional signal is provided by resistor 30A and amplier 29. When limiting of positive or negative amplitudes of the phase modulation takes place, the voltage applied to the varactor changes its capacitance and the midfrequency of the filter. The change of the midfrequency is in a direction which reduces the amplitude limitation and the difference between the midfrequency and the carrier frequency of the frequency modulated signal. The DC voltage applied to the capacitor remains substantially fixed when the phase modulation becomes sinusoidal. Therefore, a minimal difference between the midfrequency and the carrier can be achieved by selecting a magnitude for the 20 Hz signal such that the phase modulation is sinusoidal when the minimal difference is achieved.

The local oscillator includes a tuned circuit having a variable capacitor 45 which determines the oscillators frequency of oscillation and capacitors 25 and 45 are coupled to selectively translate FM broadcast signals to the fixed IF amplifier 32. As is well known, in the typical FM broadcast receiver, ganged capacitors cannot be used to selectively translate all of the stations in the FM band to the center frequency of the IF amplifier. However, in the subject system, the varactor can provide the capacitance needed to more precisely center a translated signal to the midfrequency of the IF amplifier.

As previously stated, the varactor tuned circuit under discussion is tunable over the FM broadcast band. In tuning from the low frequency end of the band to the high frequency end of the band, it should be noted that the bandwidth of the varactor tuned circuit increases and, therefore, a signal from oscillator 28 having a magnitude which is sufficient to bring the midfrequency of the varactor tuned circuit into substantial coincidence with an FM signal having a carrier at the low frequency end of the band may not have sufficient magnitude to accomplish the same level of coincidence at the high frequency end of the band. This may be offset by adjusting the magnitude of the 20 Hz signal as station tuning takes place or by providing an acceptable drive at high frequencies and letting the circuit be overdriven for tuning at the low end of the band. In this regard, it should be noted that in overdriving the varactor circuit, the resulting phase modulation will tend to be limited at both ends, which results in a zero output voltage situation when the midfrequency of the filter and the carrier are tuned to coincide.

A system such as shown in FIG. 2 was manufactured to receive FM signals in the 88 to 108 megahertz band. The system was implemented as follows. Mixer 30B, limiter 32, discriminator 33 and oscillator circuit 31 are provided by an AM/FM integrated circuit, manufactured under part no. T900BI-K by Tokyo Shibaura Electric Co. and associated components used to tune and power the circuit. The integrated circuit includes an audio amplifier 50 and is connected to a speaker 51 to recover transmitted audio from broadcast FM signals. The phase shift discriminator is coupled by a 40 Hz active band-pass filter to a synchronous detector 36 including an MC 1496 integrated circuit. As is known, this type of detector is little more than a synchronous switch and transitions can be made to occur near zero crossings of a sinusoidal signal, the difference in time between transitions and crossings being related to the amplitude of the signal. A square shaped signal can provide the same effect. In the manufactured system multiplier 37 included a monostable timer, incorporating a 555 IC timer, driven by the oscillator to provide the square waveform. Persons skilled in the art may note that multiplier 37 can even be a full wave rectifier.

The DC output signal of the detector is applied to an operational amplifier integrator 42 having the customary feedback capacitor. The output of integrator 42 is coupled through amplifier 29 to varactor 24 with the gain and polarity adjusted to make the resonant frequency $f_i$ move closer to the frequency $f_1$ of an applied signal, thereby reducing the tracking error. Since the varactor has effectively replaced the trimming capacitor normally used for tracking alignment, the settling point of the varactor voltage corresponds to the trimming capacitor adjustment, and the variable capacitance range required for this purpose will have a similar value. With, as is typical, the phase discriminator having adjacent channel attenuation, and excursion of the varactor voltage from oscillator 28 restricted to prevent audio distortion, it is recognized that unless the initial varactor voltage is clamped near its eventual settling point, small signals will not pass through the radio and the integrator will remain dormant. To obviate this condition, a search function was incorporated in integrator 42 in the form of a saw-tooth integrator. More specifically, with no signal applied to the radio, a relatively large saw-tooth voltage was applied to varactor 24 to make sure that the resonant frequency $f_i$ was perfectly tracked to any anticipated signal frequency $f_1$ at least 4 times each second. To acquire the signal, the ramp voltage was halted when detector 36 gave evidence of an incoming signal and subsequently the integrator was controlled by the error voltage from detector 36. In the integrator 42 manufactured a pair of suitably biased transistors across the feedback capacitor limited the range of ramp voltage coupled to varactor 24 through amplifier 29 from 8 to 11 volts while the voltage from oscillator 28 coupled to varactor 24 through amplifier 29 had a ±0.4 volt excursion. The rated capacitance of varactor 24 was about 15 pf., and is available under part number MV2261. With a larger varactor installed, the capacitance variation created by oscillator 28 would need to remain the same to prevent distortion, however the search variation could be increased to cover a greater tuning range.

Since the selectivity of the tuned circuit preceeding the mixer provides the signal-to-image ratio, the minimum loaded Q for the antenna resonant circuit can be specified. In practice, a Q of between 50 and 100 is acceptable. Considering linear phase to exist over a frequency range of ±B/3, with $f_1 = 98$ MHz, a loaded Q of 65 would provide linear phase over a frequency range of ±0.5 MHz.

As is known, FM radio stations transmit audio information within an audio bandwidth ranging from 50 Hz to a maximum frequency of about 15 KHz. Therefore, it should be appreciated that the 20 and 40 Hz signals generated are outside of the audio bandwidth. A system, according to the invention, can also be provided using a signal above the audio bandwidth. For example, the system of FIG. 2 may be modified so that the oscillator, or some other means, provides a 17.5 KHz signal and the amplifier-limiter is coupled to a phase lock loop detector, which replaces the discriminator, to recover phase modulation imposed on an FM signal coupled to the tuned varactor circuit. In the modified system, the recovered phase modulation is coupled to a quadrature detector which replaces the synchronous detector. The quadracture detector should be driven by a 90 degree phase shifted signal derived from the oscillator to provide an error voltage suitable for driving the integrator.

The systems described above may be modified by persons skilled in the art to which the invention pertains in ways which are consistent with the spirit of the invention. Therefore, it should be understood that the description herein of embodiments, according to the invention, have been set forth as examples thereof and should not be construed or interpreted to limit the scope of the claims which follow and define the invention.

What is claimed is:

1. A tunable band-pass filtering system responsive to the carrier frequency of a frequency modulated signal in the band-pass for substantial alignment therewith comprising:
   a. a tunable band-pass filter having a phase characteristic which is substantially linear to signal frequencies in the mid-band range of the filter and non-linear to signal frequencies at either edge band range of the filter;
   b. means for periodically varying the midfrequency of the band-pass filter at a predetermined frequency rate whereby, said filter, in response to an applied frequency modulated signal, provides a similar frequency modulated signal including phase modulation at said predetermined frequency rate; and
   c. means including an amplitude limiter responsive to the magnitude of phase modulation applied at the predetermined frequency rate, to said similar frequency modulated signal for automatically tuning the midfrequency of the filter to reduce the frequency difference between the carrier frequency of the frequency modulated signal and the midfrequency of the filter.

2. A tunable band-pass filtering system, as defined in claim 1, wherein the band-pass filter is a resonant circuit including an inductor in parallel with a capacitor network including a varactor diode.

3. A tunable band-pass filtering system, as defined in claim 2, wherein said means for periodically varying the midfrequency of the filter include an oscillator providing an output signal at said predetermined frequency rate and means coupling the oscillator to the varactor diode.

4. A tunable band-pass filtering system as defined in claim 3, wherein said means responsive to the phase modulation on the similar signal includes a phase demodulator for providing a signal which is proportionally related to the phase modulation.

5. A tunable band-pass filtering system, as defined in claim 4, wherein said means responsive to the phase modulation on the similar signal includes means responsive to the amplitude of the second harmonic of the signal which is proportionally related to the phase modulation for providing a bias voltage to the varactor.

6. A tunable band-pass filtering system, as defined in claim 5, wherein the means for providing a bias voltage to the varactor include: means for providing a reference signal having a frequency equal to twice the predetermined frequency rate; a band-pass filter coupled to the phase demodulator and tuned to a frequency equal to twice the predetermined frequency rate; a synchronous detector coupled to the means for providing the reference signal and to the band-pass filter tuned to twice the predetermined frequency; and an integrator coupled to the detector.

7. A tunable band-pass filtering system, as defined in claim 2, wherein said means responsive to the phase modulation imposed on the similar signal includes a mixer coupled to the band-pass filter, a local oscillator coupled to the mixer, an intermediate frequency amplifier coupled to the mixer and means for providing a signal which is proportionally related to the phase modulation.

8. A tunable band-pass filtering system, as defined in claim 7, wherein said local oscillator includes a variable capacitor for controlling the frequency of oscillation, wherein the capacitor network includes another variable capacitor for tuning the resonant circuit, and wherein said variable capacitors are coupled to provide substantial tracking between the band-pass filter and the frequency of the oscillator.

9. A tunable band-pass filtering system responsive to the carrier frequency of a frequency modulated signal in the band-pass for substantial alignment therewith, the signal being modulated with an audio signal comprising:
   a. a tunable band-pass filter having a phase characteristic which is substantially linear to signal frequencies in the mid-band range of the filter and non-linear to signal frequencies at either edge band range of the filter;

b. means for periodically varying the midfrequency of the band-pass filter at a predetermined frequency rate, the predetermined frequency rate being outside of a bandwidth selected for passing the frequency modulated signal, said filter having the characteristic that when a frequency modulated signal is applied to the filter a similar frequency modulated signal including phase modulation at said predetermined frequency rate is produced; and c. means including an amplitude limiter responsive to the magnitude of phase modulation, at the predetermined frequency rate, on the similar signal for automatically tuning the midfrequency of the filter to reduce a frequency difference between the carrier frequency of the frequency modulated signal and the midfrequency of the filter.

10. A tunable band-pass filtering system, as defined in claim 9, wherein said predetermined frequency rate is less than 50 Hz.

11. A tunable band-pass filtering systems, as defined in claim 10, wherein the band-pass filter is a resonant circuit including an inductor in parallel with a capacitor network including a varactor diode.

12. A tunable band-pass filtering system, as defined in claim 11, wherein said means for periodically varying the midfrequency of the filter include an oscillator and means coupling the oscillator to the varactor diode.

13. A tunable band-pass filtering system, as defined in claim 12, wherein said means responsive to the phase modulation on the similar signal includes a phase demodulator for providing a signal which is proportionally related to the phase modulation.

14. A tunable band-pass filtering system, as defined in claim 13, wherein said means responsive to the phase modulation on the similar signal includes means responsive to the amplitude of the second harmonic of the signal which is proportionally related to the phase modulation for providing a bias voltage to the varactor.

* * * * *